United States Patent Office 3,437,411
Patented Apr. 8, 1969

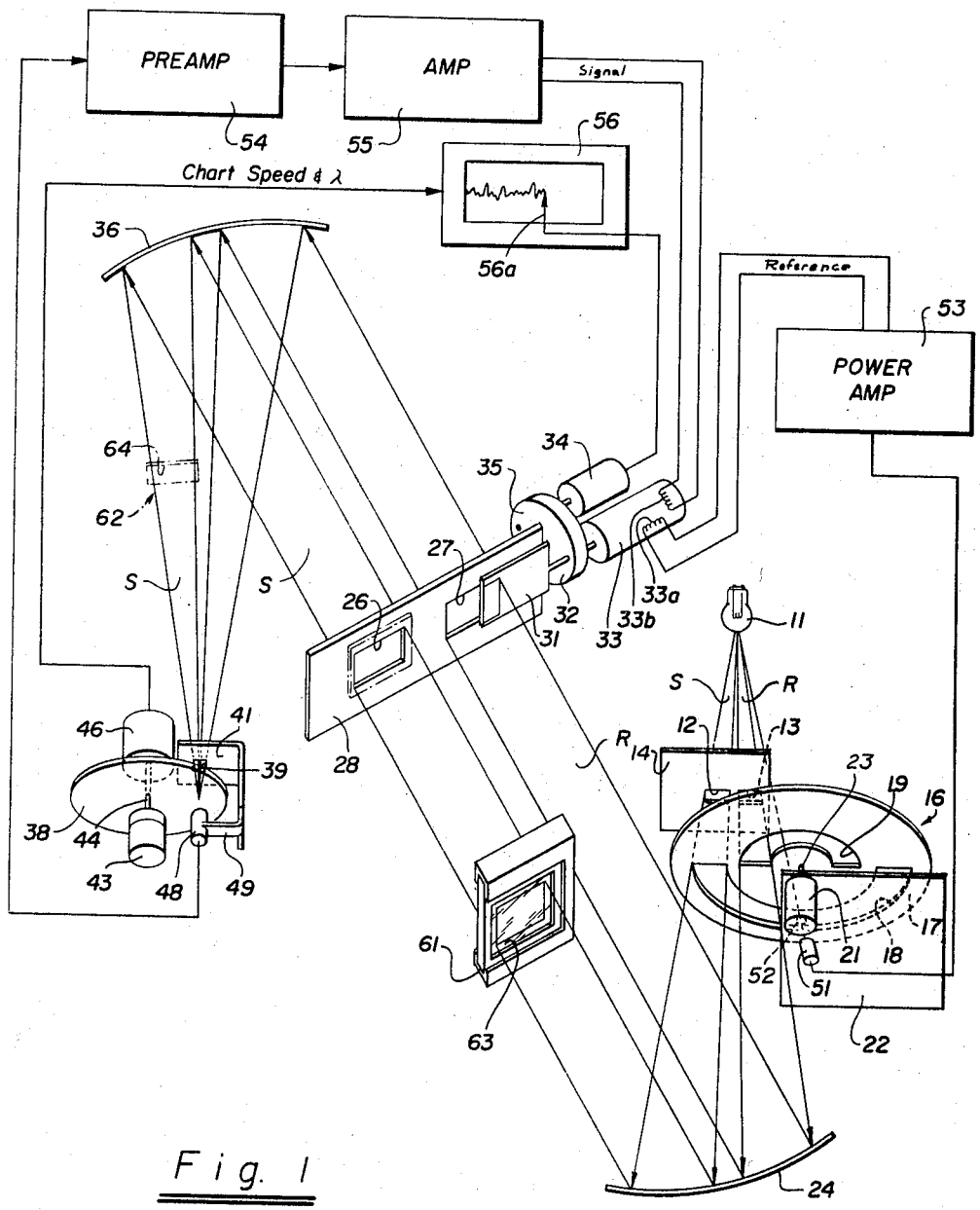
Fig. 1
INVENTORS
Andrew C. Rudomanski
Eugene A. Eufusia
Attorneys

3,437,411
OPTICAL NULL SPECTROPHOTOMETER
Andrew C. Rudomanski, Northridge, and Eugene A. Eufusia, Santa Rosa, Calif., assignors to Optical Coating Laboratory, Inc., Santa Rosa, Calif., a corporation of California
Filed Nov. 24, 1964, Ser. No. 413,432
Int. Cl. G01n *21/00;* G01j *3/00*
U.S. Cl. 356—89                                4 Claims

ABSTRACT OF THE DISCLOSURE

Optical null spectrophotometer having a circular variable filter for isolating a continuously varying wavelength band having portions of sample and reference beams therein and which also may have off axis spherical mirrors.

---

This invention relates to an optical null spectrophotometer which is relatively simple.

Presently existing optical null spectrophotometers are relatively complicated and expensive. There is a need for a new and improved optical null spectrophotometer which overcomes these objections.

In general, it is an object of the present invention to provide an optical null spectrophotometer which is relatively simple and which is inexpensive to construct.

Another object of the invention is to provide an optical null spectrophotometer of the above character in which both the sample and reference beams are collimated.

Another object of the invention is to provide an optical null spectrophotometer of the above character in which the sample and reference beams are of equal intensity and are of equal flux density in cross-section.

Another object of the invention is to provide an optical null spectrophotometer of the above character in which an opaque shutter is utilized to interrupt the collimated beam.

Another object of the invention is to provide a spectrophotometer of the above character in which the degree of interruption of the collimated beam is directly proportional to the percent transmission in the beam.

Another object of the invention is to provide a spectrophotometer of the above character in which it is possible to chop the sample beam in a number of different places.

Another object of the invention is to provide a spectrophotometer of the above character in which the sample beam is chopped at the light source to reduce sensitivity to stray light.

Another object of the invention is to provide a spectrophotometer of the above character which can be utilized in ambient light.

Another object of the invention is to provide a spectrophotometer of the above character which has an unrestricted chopping speed.

Another object of the invention is to provide a spectrophotometer of the above character in which the sample can be inserted in any point in the sample beam in the optical system.

Another object of the invention is to provide a spectrophotometer in which very small samples or relatively large samples can be utilized.

Another object of the invention is to provide a spectrophotometer which does not require a condensing optical system.

Another object of the invention is to provide a spectrophotometer of the above character in which only two optical elements are required and in which both of the optical elements are common to both the sample and reference beams.

Another object of the invention is to provide a spectrophotometer of the above character which is particularly adapted for use with a wedge filter.

Another object of the invention is to provide a spectrophotometer of the above character in which fixed apertures can be utilized to obtain optimum band widths.

Another object of the invention is to provide a spectrophotometer of the above character in which apertures of different sizes may be utilized.

Another object of the invention is to provide a spectrophotometer of the above character which is insensitive to fluctuations in line voltage.

Another object of the invention is to provide a spectrophotometer of the above character which is relatively simple to construct and which is small in size so that it can be readily carried from one location to another.

Additional objects and features of the invention will appear from the following description in which the preferred embodiments are set forth in detail in conjunction with the accompanying drawings.

Referring to the drawings:

FIGURE 1 is a schematic diagram of an optical null spectrophotometer with the electronic circuitry associated therewith being shown in block form.

Figure 2:
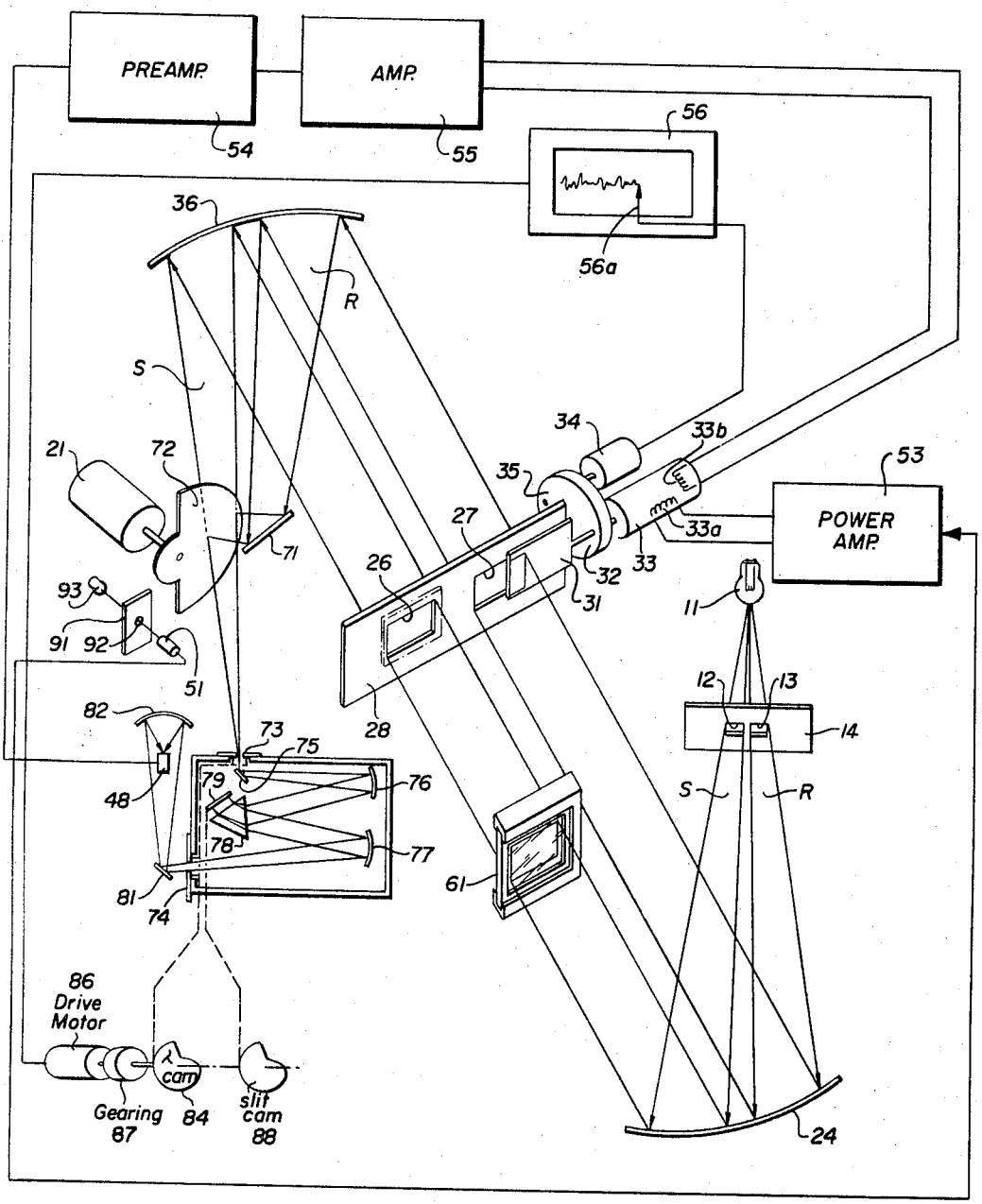
FIGURE 2 is a schematic diagram similar to FIGURE 1 of another embodiment of our optical null spectrophotometer.

In general, our optical null spectrophotometer consists of a source of radiation. A modified Czerny-Turner optical system is provided for forming a pair of collimated beams from the source of radiation and for focusing them onto a dispersing element. Means is provided for chopping both of the collimated beams. Shutter means is provided for modifying the intensity of one of the collimated beams. Means is provided for receiving the dispersed collimated beams and determining the difference in intensity between the two beams and supplying the information to the shutter means to cause operation of the shutter means so that both beams are of substantially identical intensity.

The optical null spectrophotometer as shown in FIGURE 1 consists of a source of radiation 11. Sources found to be suitable are a tungsten wire encased in glass or quartz, such as the Sylvania "Sun Gun." Another suitable source is a Nernst source. The source can also be a black body, a glow bar or any of the other types of sources which are used in spectral instruments. The radiation from the source 11 passes through two apertures 12 and 13 provided in a plate 14 of a suitable shape such as rectangular so that two beams of radiation are formed which can be identified as S and R. If desired, the aperture 12 and 13 can be circular. As hereinafter explained, the S beam is the sample beam, whereas the R beam is the reference beam. The radiation in the two beams is interrupted by an opaque optical chopper 16 which causes the two beams S and R to be pulsed as nearly square waves 180° out of phase.

The optical chopper consists of a disc 17 which is provided with two semi-circular apertures 18 and 19 having widths proportional to the widths of the apertures 12 and 13. The apertures 18 and 19 extend through 780° and are spaced 180° out of phase with each other in the disc 17. The apertures 18 and 19 are positioned so that beam S passes through the aperture 18 and the beam R passes through the aperture 19. The optical chopper also includes an electric motor 21 mounted on a plate 22 and which has its shaft 23 rotatably mounted in the plate 22 and secured to the chopper disc 17. The disc 17 is driven at a suitable speed such as 1800 r.p.m. so that the beams S and R are chopped at a suitable speed as, for example, 30 cycles per second.

After the two beams of radiated energy S and R are chopped or modulated, the two beams of energy then strike and are collected by an off-axis first spherical optical element 24. The optical element 24 is positioned so that the source 11 is at the focal point of the element 24. As shown in FIGURE 1, the first surface of the element 24 is a mirror which causes the beams S and R to be reflected therefrom as substantially collimated so that the beams travel in a direction substantially parallel to each other. The mirror 24 also causes the beams to have a substantially uniform radiation density in cross-section and substantially a uniform intensity. This is true because both of the beams are derived from the same source.

The reflected beams S and R pass through a second set of apertures 26 and 27 provided in a plate 28. The apertures 26 and 27 are preferably rectangular or square. In addition, the aperture 27 is preferably slightly larger than the aperture 26. Shutter means is provided for interrupting the reference beam R passing through the aperture 27 and consists of an opaque rectangular member 31 which is advanced and retracted by a gearing assembly 32 driven by a servo 33. The gearing assembly 32 translates the rotary motion of the output shaft of the servo 33 into linear motion for movement of the shutter member 31. The servo motor 33 also drives a potentiometer 34 through gearing 35. The potentiometer is provided for determining the position of the shutter 31 as hereinafter described. As hereinafter explained, the shutter 31 is utilized for attenuating the reference beam R passing through the aperture 27 so that the two beams S and R, after passing through the apertures 26 and 27, are of equal intensity.

The beams S and R, after passing through the apertures 26 and 27, are collected by a second off-axis spherical optical element 36. This optical element 36 has a first surface which is also a mirror substantially identical to the mirror on element 24.

The two-element off-axis spherical optical system consisting of the optical elements 24 and 26 can be described as a modified Czerny-Turner two-element off-axis spherical optical system. As is well known to those skilled in the art, by utilizing such a two-element spherical optical system, the image obtained from the second spherical element 36 is self-correcting, or in other words, spherical aberrations are removed. Spherical aberrations produced by the first mirror are cancelled out by similar aberrations produced in the second mirror to thereby provide an image from the second mirror which is a good, sharp image in the focal plane to thereby provide an image of high quality. With such an optical system, it can be seen that the sysem utilizes only two optical elements and that both optical elements are common to both the sample and reference beams.

The sample and reference beams are reflected by the optical element 36 and are focused onto a filter element 38 of a suitable type through an aperture or slit 39 in a support plate 41. The filter element 38 can be of any suitable type which takes polychromatic light and renders it monochromatic, or in other words, in which the two beams S and R focused on the dispersing element are separated into two monochromatic beams of the same wavelength. One such dispersing element found to be particularly satisfactory is a circular wedge type filter of the type described in copending application Ser. No. 391,928, filed Aug. 25, 1964, and entitled "Circular Wedge Filter and Method and Apparatus for Manufacture of the Same." Other types of dispersing elements can be utilized if desired as, for example, a linear wedge as hereinafter explained.

Means is provided for causing movement of the dispersing element 38 with respect to the aperture or slit 39 and consists of a variable speed D.C. motor 43 with speed reducing means incorporated therein and having an output shaft 44 which is secured to and drives the circular wedge filter 38. Means is provided for measuring the shaft position of the motor 43 which consists of a continuous turning potentiometer 46 which also can be called a wavelength potentiometer for reasons which will be readily apparent hereinafter.

Means is provided for detecting the two monochromatic beams after they have passed through the dispensing element 38 and consists of a detector 48. One type of detector found to be particularly satisfactory is a lead sulfide cell type N1 manufactured by Eastman Kodak. The cell 48 is supported in a suitable manner such as by means of a bracket 49 secured to the plate 41.

Means is provided for continuously sensing the output from the radiation source 11 to provide a servo reference and consists of a detector 51 which is mounted on the plate 22 and senses the light passing through the aperture 18 and through an aperture 52 provided in the plate 22. The aperture 52 is positioned so that it is 90° out of phase with the apertures 12 and 13 provided in the aperture plate 14. In other words, the aperture 52 is positioned 90° away from the apertures 12 and 13 in a counterclockwise direction as viewed in FIGURE 1. The detector 51 can be of any suitable type such as a photosensitive diode. The output of the detector 51 is connected to a power amplifier 53. The output of the power amplifier 52 is connected to the reference winding 33a of the servo 33.

The output of the detector 48 is connected to a preamplifier 54. The output of the preamplifier 54 is connected to a power amplifier 55. The output of the power amplifier 55 is connected to the signal winding 33b of the servo 33. The output of the potentiometer 46 is connected to the chart drive of a suitable strip chart recorder 56 such as the Model 135 X–Y recorder manufactured by the F. L. Mosley Company of Pasadena, Calif. The output of the potentiometer 34 is connected to the pen 56a of the strip chart recorder.

Means is provided for inserting a sample in the sample beam and consists of a sample holder 61 which is mounted between the optical element 24 and the plate 28. Another sample holder 62 is also provided which is disposed between the optical element 36 and the dispersing element 38. The sample holders 61 and 62 are provided with apertures 63 and 64, respectively, through which the sample beam passes. The positions of the sample holders 61 and 62 shown are merely illustrative of the positions in which sample holders can be positioned in the apparatus. The sample holders can be positioned in any place where the sample beam is chopped.

In view of the fact that the sample beam is chopped by the chopper 16 very close to the source 11, it can be seen that there is great latitude in positioning of the sample in the sample beam. Thus, for a routine analysis, a relatively large sample holder 61 can be utilized where the beam is large. However, where it is desired to analyze a microsample, the sample holder can be positioned as is the sample holder 62 to analyze the micro specimen because at this point the sample beam is much smaller in size.

Operation of our optical null spectrophotometer in practicing our method may now be briefly described as follows. Let it be assumed that the spectrophotometer is already operating and that there is no sample present in either of the sample holders 61 or 62. When this is the case, the shutter 31 is positioned so that the aperture 27 is as large as the aperture 26 so that the two chopped beams S and R, which are chopped 180° out of phase with each other, are of equal intensity and are focused onto the dispersing element 38 and detected by the detector 48. The detector serves to algebraically add the two monochromatic beams which are received and which are 180° out of phase and of equal intensity. Since the two beams are related in this manner, a D.C. level is produced by the detector 48 to provide what appears to be an unchopped output signal. When this is the case, a null condition has been reached because the servo motor 33 will only operate on an A.C. signal supplied to the signal winding 33b.

A reference frequency is continuously being supplied to the reference winding 33a of the servo 33. Assuming that the motor 21 is operating at 1800 r.p.m., the reference frequency will be 30 cycles per second. This reference frequency is obtained from the reference detector 51 which, as explained previously, is positioned so that the light from the source 11 must pass through the aperture 18 and through the aperture 52 so that the light is chopped at a rate of 30 cycles per second. The aperture 52 is positioned in such a manner that the light is chopped 90° out of phase from the light which is chopped passing through the apertures 12 and 13. This 30 cycle signal, since it is obtained from a high intensity light, is supplied directly to a power amplifier 52 which amplifies the same and supplies it to the reference winding 33a of the servo motor, or in other words, one phase of a two phase motor 33.

Now, let it be assumed that a sample has been inserted in one of the sample holders 61 and 62 and that the intensity of the sample beam sensed by the detector is less than the intensity of the reference beam. When this is the case, an A.C. signal of one phase is produced by the detector 48 which is amplified by the preamplifier 54 and supplied to the power amplifier 55. This A.C. signal causes the servo 33 to operate in a direction to cause the shutter 31 to make the aperture 27 smaller. This continues until the intensities of the sample and reference beams are identical, at which time the detector 48 senses this balanced intensity condition of the two beams to again provide a null condition upon which the servo 33 stops operating.

This intensity information is supplied through the potentiometer 34 to the recording pen 56a of the strip chart recorder to thereby provide the Y information on the X–Y recorder. The potentiometer 46 supplies the signal for operating the motor of the strip chart recorder and for controlling the chart speed, or in other words, the X information for the X–Y recorder. As pointed out previously, the potentiometer 46 senses the position of the circular wedge filter or dispersing element 38. The circular wedge filter, as described in the copending application Ser. No. 391,928, filed Aug. 25, 1964, transmits a series of wavelengths which are gradually decreasing or gradually increasing as, for example, from 1.7 microns to 3.4 microns, to thereby make it possible to determine the absorption band or bands of the sample and the percentage of transmission or percentage of absorption in the transmission or absorption band of the sample. Thus, it can be seen that the output of the potentiometer 46 is directly related to the wavelength being transmitted through the dispersing element 38 and that the output of the potentiometer can be utilized for driving the chart of the strip chart recorder 56.

Let it be assumed that the intensity of the reference beam is less than that of the sample beam. When this is true, the detector 48 will produce an A-C signal which is 180° out of phase with the signal when the sample beam is of greater intensity than the reference beam to thereby cause the servo 33 to be driven in an opposite direction and to move the shutter 31 in a direction to increase the size of the aperture 27 until a null condition is reached in the same manner as hereinbefore described. Thus, it can be seen that the servo motor 33 will be driven in one direction when one beam is of greater intensity than the other beam, and will be driven in an opposite direction when the converse is true. It is only when the intensity of both of the beams are identical that a null condition is reached and the servo 33 will remain stationary.

It also can be seen that since the detector 48 senses the energy which passes through the circular wedge 38, the amount of energy being transmitted or reflected by the sample at a particular wavelength can be readily determined and is plotted on the X–Y recorder 56. Thus, the optical null spectrophotometer shown in FIGURE 1 can be utilized for ascertaining absorption or transmission bands and the percentage of transmission or the percentage of absorption in the band. In other words, the information is treated photometrically.

The optical system utilized in our optical null spectrophotometer has many unique advantages. Because of the fact that the beams are collimated, convenient shapes as, for example, a rectangle or a square, can be utilized for the apertures in which the size of the beam passing through the apertures can be interrupted by an opaque shutter and which the degree of interruption is directly proportional to the percent transmission in the sample beam. In other words, the position of the shutter determines the amount of attenuation that is taking place in the sample beam. Thus, it can be seen that the use of collimated beams makes possible a very simple arrangement. Since the collimated beams are pulsed square waves, any type of attenuation can be utilized and the spectral detector will still see a square wave. In other words, attenuation of the collimated beam does not change its waveform.

By chopping very close to the source of the radiant energy, the optical null spectrophotometer is made insensitive to stray light and, in fact, can be operated satisfactorily with the apparatus exposed in normal ambient light conditions. Another major advantage of the optical system is that the optical system utilizes only two optical elements and the optical elements are common to both the same and reference beams. The optical system is very efficient and this is particularly true of the circular wedge. The optical system is also very compact.

Although the optical null spectrophotometer has been described in conjunction with a strip chart recorder 56, and then use of a drive motor 43 for driving the dispersing element 38 is not absolutely necessary. The dispersing element 38 can be moved manually if desired and the chart moved manually in accordance with the positioning of the circular wedge. Alternatively, a drive motor can be utilized and this can be used for driving a cam for operating pulsing contacts for producing pulses to drive the recorder rather than the continuous drive provided by the potentiometer 46.

As explained in copending application Ser. No. 391,928, filed Aug. 25, 1964, the circular wedge filter 38 has a dispersion which is a constant percentage of the central wavelength when utilized with a fixed limiting aperture. If desired, a plurailty of fixed apertures can be utilized which can be stepped into place in different positions on the wedge filter. In other words, the aperture provided need not be a continuously changing slit. Thus, an aperture can be moved in place to provide a dispersion which is a constant percentage of the central wavelength of the portion of the circular wedge filter being used at that particular time. The apertures of different sizes can be utilized immediately to obtain an optimum bandwidth for each wavelength. In the circular wedge filter, the positions of the central wavelengths are linear with angle.

The phase relationship presented to the servo 33 is directed related to the optical phenomena being measured. This is true because the 90° out-of-phase signal is obtained in the spectrophotometer itself by positioning the reference detector 51, 90° out of phase wtih the apertures 12 and 13. Thus, in our apparatus, the output from the reference detector has a direct mechanical relationship to the actual radiation phenomena being measured. Because of this fact, the apparatus is not frequency dependent and wide variations in line or supply voltage can be tolerated. This particularly lends itself to portability and as, for example, operation from an inverter which can be supplied from a suitable supply such as a 12 volt battery.

Although we have described the optical null spectrophotometer primarily for use with a circular wedge filter, it is readily apparent that if desired, a linear wedge can be used and that it would merely be necessary to provide means for shifting the linear wedge back and forth across the detector 48 in the same manner that the circular wedge is shifted.

Another embodiment of our optical null spectrophotometer is shown in FIGURE 2 in which certain conventional apparatus and techniques are utilized. Radiation from a source 11 is supplied through the apertures 12 and 13 in the plate 14 to the first off-axis spherical optical element 24 which causes the beams S and R passing through the apertures 12 and 13 to be formed into substantially collimated beams S and R travelling through the apertures 26 and 27 of the plate 28. The beams are then reflected by the second off-axis spherical optical element 36 and focused to pass through a slit 73.

The sample and reference beams must then be combined. This is accomplished by means of a planar mirror 71 which is positioned to receive the reference beam R from the element 36 and to reflect the reference beam onto a chopper 72 in which the opaque sections of the chopper are reflecting. The chopper is also positioned so that it can block the sample beam S as shown. The chopper 72 is driven by the motor 21. When the chopper blade of the chopper 72 is blocking the sample beam S from passing through the slit 73, the chopper blade will cause the reference beam R to be reflected into the slit 73. Conversely, when the chopper has been shifted through 90°, the chopper blade will be out of the path of the sample beam S and the sample beam will pass through the slit 73. Thus, with a chopper blade subtending 180°, each beam will pass through the slit 73 during one 180° interval during each complete revolution of the chopper blade.

The slit 73 forms part of a conventional optical assembly which includes another slit 74, a pair of mirrors 76 and 77, a prism 78 with a Littrow mirror 79, and a mirror 81. As shown, the combined light beams pass through the slit 73 and are reflected by a planar mirror 75 onto a curved mirror 76. The curved mirror 76 causes the beam to pass through the prism 78 and to be reflected from the Littrow mirror 79 back through the prism and onto a curved mirror 77 and out through the slit 74. The beam is then reflected by a planar mirror 81 onto a curved mirror 82 where it is focused onto the detector 48. As is well known to those skilled in the art, the Littrow mirror 79 is on a movable base and since the dispersion of the prism 78 is non-linear, the Littrow mirror must be driven in a non-linear fashion. This is accomplished by means of the cam 84 which is identified as the λ or wavelength cam. The cam 84 is driven by a drive motor 86 through speed reducing gearing 87. The cam 84 is designed so that a linear wavelength output will be produced. In order to achieve this linear wavelength output, the size of the slits 73 and 74 also must be controlled. This is accomplished by a slit cam 88 which is also driven by the drive motor 86 through the gearing 87. The drive motor 86 can, therefore, be considered as means for measuring the wavelength and can be utilized for driving directly the chart of the strip chart recorder 56.

The reference for the servo 33 is obtained from a detector 51 mounted in a plate 91. The plate 91 is provided with an aperture 92 adapted to receive radiation in the form of light from a suitable source 93 such as a General Electric 222 lamp. The output from the reference detector 51 is supplied to the power amplifier 52 and the output of the power amplifier is supplied to the reference winding 33a of the servo 33. As in the previous embodiment, the reference signal is supplied 90° out-of-phase with the chopped sample and reference beams.

Operation of this embodiment of our optical null spectrophotometer is very similar to that for the optical null spectrophotometer hereinbefore described. Parallel collimated sample and reference beams are provided by the use of two spherical mirrors which are common to both the sample and reference beams. When a sample is inserted in the sample beam and the intensity is less than the intensity of the reference beam, an A-C signal will be produced as hereinbefore described which will cause the servo 33 to operate in one direction. When the intensity of the reference beam is less than the intensity of the sample beam, the converse will occur and the servo will be caused to operate in the opposite direction until the shutter 31 is moved to a position in which the sample and reference beams have the same intensity to thereby create a null condition.

From the foregoing, it can be seen that different dispersing elements such as a circular wedge, a linear wedge, a prism, or an optical grating can be utilized while still making it possible to achieve a greatly improved optical null spectrophotometer and method. In all of the embodiments, parallel collimated sample and reference beams are provided with an optical system in which two spherical mirrors are common to both the sample and reference beams. In each of the embodiments, the servo motor is driven from two opto-mechanical references, one of which is the detector 48, and the other of which is the servo reference detector 51 which is 90° out of phase with the chopped signal.

It is apparent from the foregoing that we have provided a new and improved optical null spectrophotometer and method which have many outstanding features as pointed out above.

We claim:

1. A spectrophotometer consisting in the order named of a source of radiation, means receiving radiation from said source and forming said radiation into spaced sample and reference beams, said sample beam being accessible so that a sample can be inserted into the sample beam, chopper and attenuating means mounted in the path of said sample and reference beams, said chopper means including a chopper which is constructed with at least one opaque portion through which radiation cannot pass and at least one other portion through which radiation can pass, and means for rotating said chopper whereby as the chopper is rotated the sample and reference beams are chopped out of phase with each other with one beam being cut off while the other is allowed to pass, said attenuating means attenuating the reference beam in a linear measurable manner to substantially the same intensity as the sample beam with the sample therein, said means for attenuating the reference beam including means forming a rectangular aperture for the reference beam and shutter means for opening and closing said rectangular aperture in a linear manner, means independent of the chopper means for combining the sample and reference beams, a filter mounted in the path of said combined sample and reference beams so that said combined sample and reference beams pass through said filter, said filter having a coating deposited thereon which has a thickness which varies along at least part of a circle, means for rotating the said filter so that the said filter serves to isolate a continuously varying wavelength band having portions of said sample and reference beams therein, and detecting means for detecting the said combined sample and reference beams after they have passed through said filter.

2. A spectrophotometer as in claim 1 wherein said attenuating means includes a servo having a reference winding and a signal winding, means connected to said reference winding forming a chopped reference signal which is out of phase with said chopped sample and reference beams and means connecting the output of the detector to said signal winding.

3. A spectrophotometer as in claim 2 wherein said means forming a chopped reference signal includes an additional detector disposed adjacent said chopper so that radiation from said source passes to said additional detector and is periodically interrupted by said chopper.

4. A spectrophotometer as in claim 1 together with an x–y recorder having a pen and a chart drive, means connected to said means for rotating said filter and connected to the chart drive for supplying a signal to the chart drive, and means connected to said servo and to said pen for supplying a signal to said pen.

(References on following page)

References Cited

UNITED STATES PATENTS

| | | |
|---|---|---|
| 2,269,674 | 1/1942 | Liddel et al. |
| 2,439,373 | 4/1948 | Stearns. |
| 2,605,671 | 8/1948 | Canada. |
| 2,631,489 | 3/1953 | Golay. |
| 3,016,800 | 1/1962 | Pliskin. |
| 3,039,353 | 6/1962 | Coates et al. |
| 3,062,088 | 11/1962 | Bolz. |
| 3,071,037 | 1/1963 | Brumley. |

FOREIGN PATENTS 1,314,569   12/1962   France.

JEWELL H. PEDERSEN, *Primary Examiner.*

V. P. McGRAW, *Assistant Examiner.*

U.S. Cl. X.R.

356—93